US009902486B2

(12) United States Patent
Norden (10) Patent No.: US 9,902,486 B2
(45) Date of Patent: Feb. 27, 2018

(54) TRANSITION ARRANGEMENT FOR AN AIRCRAFT

(71) Applicant: Christian Emmanuel Norden, Pretoria (ZA)

(72) Inventor: Christian Emmanuel Norden, Pretoria (ZA)

(*) Notice: Subject to any disclaimer, the term of this patent is extended or adjusted under 35 U.S.C. 154(b) by 110 days.

(21) Appl. No.: 14/784,342

(22) PCT Filed: Apr. 14, 2014

(86) PCT No.: PCT/ZA2014/000019
§ 371 (c)(1),
(2) Date: Oct. 14, 2015

(87) PCT Pub. No.: WO2014/172719
PCT Pub. Date: Oct. 23, 2014

(65) Prior Publication Data
US 2016/0052618 A1 Feb. 25, 2016

(30) Foreign Application Priority Data

Apr. 15, 2013 (ZA) .................. 2013/02689

(51) Int. Cl.
*B64C 3/38* (2006.01)
*B64C 29/00* (2006.01)

(52) U.S. Cl.
CPC .......... *B64C 3/385* (2013.01); *B64C 29/0025* (2013.01)

(58) Field of Classification Search
CPC . B64C 3/385; B64C 39/001; B64C 2201/102; B64C 5/08; B64C 3/00; B64C 9/26
See application file for complete search history.

(56) References Cited

U.S. PATENT DOCUMENTS

| 3,047,257 | A |   | 7/1962 | Chester |
| 3,223,356 | A | * | 12/1965 | Alvarez-Calderon B64C 29/0016 244/13 |
| 3,666,209 | A | * | 5/1972 | Taylor ................ B64C 29/0033 244/12.4 |
| 5,110,072 | A |   | 5/1992 | Owl |
| 5,405,105 | A |   | 4/1995 | Kress |
| 5,758,844 | A |   | 6/1998 | Cummings |

FOREIGN PATENT DOCUMENTS

| DE | 10200602888 A1 | 3/2007 |
| GB | 2100684 A | 1/1983 |
| WO | 04426 A1 | 12/1982 |

OTHER PUBLICATIONS

PCT Pat. App. No. PCT/ZA2014/000019, PCT International Search Report dated Mar. 13, 2015, 6 pp.

* cited by examiner

*Primary Examiner* — Assres H Woldemaryam
(74) *Attorney, Agent, or Firm* — Fay Sharpe LLP (57) ABSTRACT

According to the invention there is provided a transition arrangement (10) for an aircraft for aiding stabilization of an aircraft between substantially vertical and horizontal flight of the aircraft, the transition arrangement (10) including an aerofoil (12) and mounting means for mounting the aerofoil rotatable between a leading (18) and/or a trailing edge (20) of an aircraft wing.

15 Claims, 6 Drawing Sheets

TRANSITION ARRANGEMENT FOR AN AIRCRAFT

TECHNICAL FIELD OF THE INVENTION

This invention relates to a transition arrangement for an aircraft and to an aircraft including a transition arrangement. More particularly, the invention relates to a transition arrangement for an aircraft for aiding stabilization of an aircraft between and during substantially vertical and forward flight of the aircraft, and for coping with emergencies.

BACKGROUND TO THE INVENTION

The inventor is aware of airfoils rotating about a longitudinal axis thereof for generating lift in aircraft.

The inventor is also aware of aerodynamic lift generating devices wherein the Magnus effect is utilised in order to stabilise aircraft, via the rapid rotation of the wings of such an aircraft.

One of the problems of using a rotating airfoil without any other means of lift force, is that the lift force created by a rotating airfoil generates lift, but this is accompanied by a correspondingly high drag, yielding a lower lift-to-drag ratio.

The inventor having considered the above thus propose the use of wings on an aircraft that will operate in various modes whereunder as conventional static wings, rapid engine as well as airflow driven mode, according to the invention described herein below.

GENERAL DESCRIPTION OF THE INVENTION

According to a first aspect of the invention there is provided a transition arrangement for an aircraft for aiding stabilization of an aircraft between substantially vertical and horizontal flight of the aircraft, the transition arrangement including:—
  an aerofoil; and
  mounting means for mounting the aerofoil rotatably between or adjacent a leading and/or a trailing edge of an aircraft wing.

The aerofoil may include its own leading and trailing edges. The leading and trailing edges may be mounted pivotally on or by a flexible link to the aerofoil.

The transition arrangement may include a rotary drive means for rotating the aerofoil via the mounting means in operation.

The mounting means may be in the form of a primary shaft which may extend longitudinally the wing from a distal wing tip region towards a proximal region, where the wing extends from a fuselage of the aircraft. The primary shaft may be rotatable.

The mounting means may include a plurality of secondary shafts which are connected to the primary shaft or shaft mount in a substantially parallel spaced relationship relative thereto. The primary and secondary shafts may be interconnected via linkages which may allow the primary and secondary shafts to be rotatable relative to each other.

The wing may be rotatable around the primary shaft.

Aerofoils may be mounted rotatably to the secondary shafts. A further aerofoil may be mounted on the primary shaft, which further aerofoil may be of generally stepped or z-form to allow, together with the secondary aerofoils, to close off or span an opening or space defined between the leading and trailing edges of the wing in an inoperative condition of the transition arrangement thereby to facilitate forward flight of the aircraft after transition from vertical to horizontal flight. The aerofoils may be arranged to extend longitudinally the shafts and hence the wing of the aircraft.

The transition arrangement as described may be mounted in a tail wing of the aircraft.

According to a second aspect of the invention there is provided an aircraft including a transition arrangement as set out above.

The aircraft may include a fuselage with wings configured to extend outward therefrom. The aircraft may include more than one set of wings which may include ailerons and/or elevators.

The aircraft may include propulsion means which may be arranged onto the wings and/or the fuselage to facilitate vertical and/or horizontal flight, and may be in the form of engine driven rotors/propellers and/or ducted fans.

The propulsion means may be arranged so as to provide for a lifting component of propulsion, when in use. The propulsion means may be arranged so as to provide for a forward component of propulsion, when in use. The propulsion means may be articulated so as to move between a first position yielding a lifting component of propulsion, and a second tilted position, yielding a forward component of propulsion.

The aircraft may be propelled by a single rotor/propeller, or by a plurality thereof.

The aircraft may be propelled by a group of four rotors/propellers, arranged in a substantially square and/or rectangular formation. Stability of the aircraft may be created by having each set of diagonally opposed rotors/propellers rotate in the same direction, but opposite to the direction of rotation of the remaining set of rotors/propellers, as is the case with so-called quad- or multicopters.

The transition arrangement may include stabilising means to aid further stabilisation of the aircraft during transition.

The stabilisation means may be in the form of ducted fans, which may be mounted on the aircraft and forward the tail wings. The fans may be configured to extend outwards the fuselage.

DETAILED DESCRIPTION OF THE INVENTION

A transition arrangement in accordance with the invention will now be described by way of example with reference to the accompanying drawings.

Turning now to FIGS. 1 to 5, reference numeral 10 generally designates a first embodiment of a transition arrangement in accordance with the invention. More particularly, the transition arrangement 10 includes an aerofoil or wing 12 which, mounted rotatably on a shaft 14 attached to the main aircraft structure, permits rotation thereof in the direction of arrow 16. The aerofoil 12 in flight direction 11, has leading and trading edge members 18 and 20 which are mounted pivotally on shafts 22 and 24 to allow pivoting thereof between static positions 26a and 26b for flying without wing spinning, positions 18b and 20b for engine-powered wing rotation, and positions 30a and 30b for airflow-powered or auto-rotation. Potential pivot points 32 and 34 could be provided for additional articulation points to give a smoother wing curvature, as more clearly shown in FIGS. 4 and 5. FIGS. 2 to 5 give wings similar to that in FIG. 1, with leading and trailing edge members 18 and 20 in FIG. 2, and members 18, 18a, 20 and 20a in FIG. 4 in position for conventional flying without wings spinning, and the wings in FIGS. 3 and 5 have the same members articulated for autorotation. Endplates 35 and 37 assist in enhancing the Magnus effect during rapid rotation of the wing 12.

Figure 6:
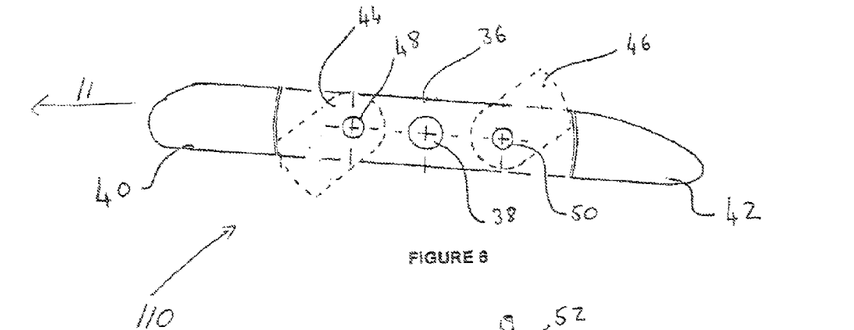
FIGS. 6 and 7 are cross sectional schematics of two further embodiments of a transition arrangement for an aircraft, in accordance with the invention.

In FIG. 6, reference numeral 110 generally depicts a second embodiment of a transition arrangement in accordance with the invention. The transition arrangement 110 includes an aerofoil 36 which is mounted rotatably around a shaft 38, with leading and trailing edges 40 and 42 of a wing structure which is statically attached to an aircraft or airborne platform (not shown). The aerofoil 36 has its own leading and trailing edges 44 and 46 which are configured to be articulated around pivots 48 and 50 in order to change its shape, inter alia for auto-rotation. The static leading and trailing edges 40 and 42 can be replaced by a static leading or trailing edge with the remaining edge rotating with the rotatable aerofoil; thus the static edge can accommodate the control devices such as aileron or elevator.

Figure 7:
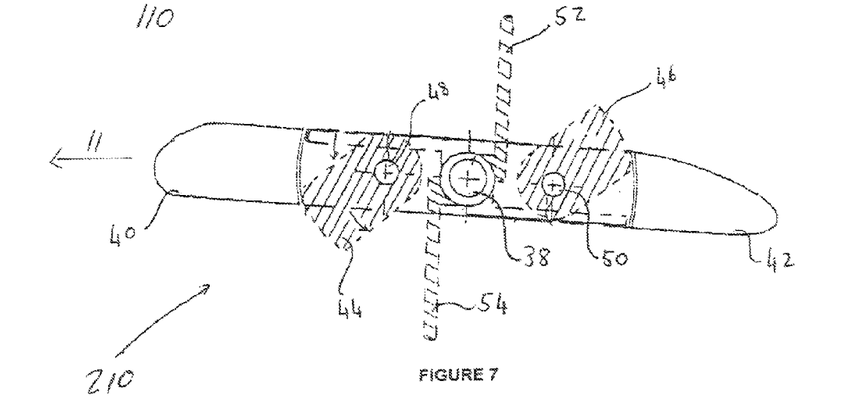

In FIG. 7, reference numeral 210 generally denotes a transition arrangement that is similar to arrangement 110 but which has additional aerofoils 52 and 54 rotatably mounted on shaft 38 to increase the Magnus effect and to aid in the balancing of drag forces during, e.g., vertical flight, when rapid adaptive changes in foil angle of one wing relative to another can aid in stable flight.

Figure 8:
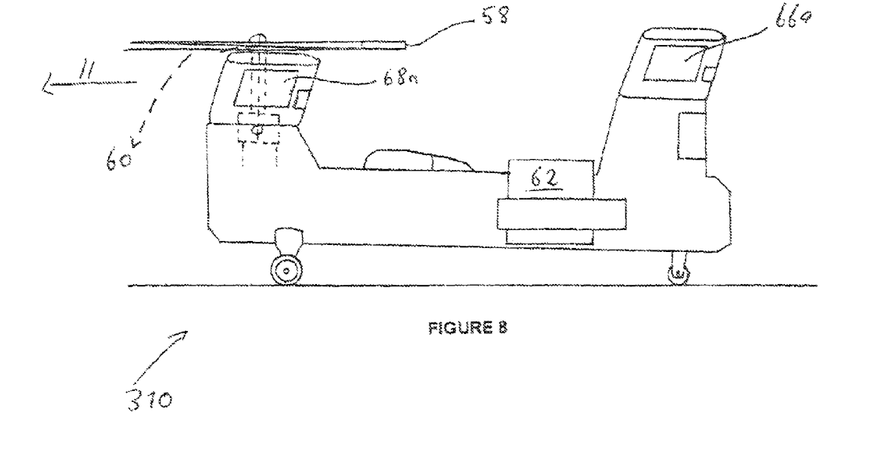
FIGS. 8, 9 and 10 are side, plan and front views respectively of a first embodiment of an aircraft including a transition arrangement, in accordance with the invention.
Figure 9:
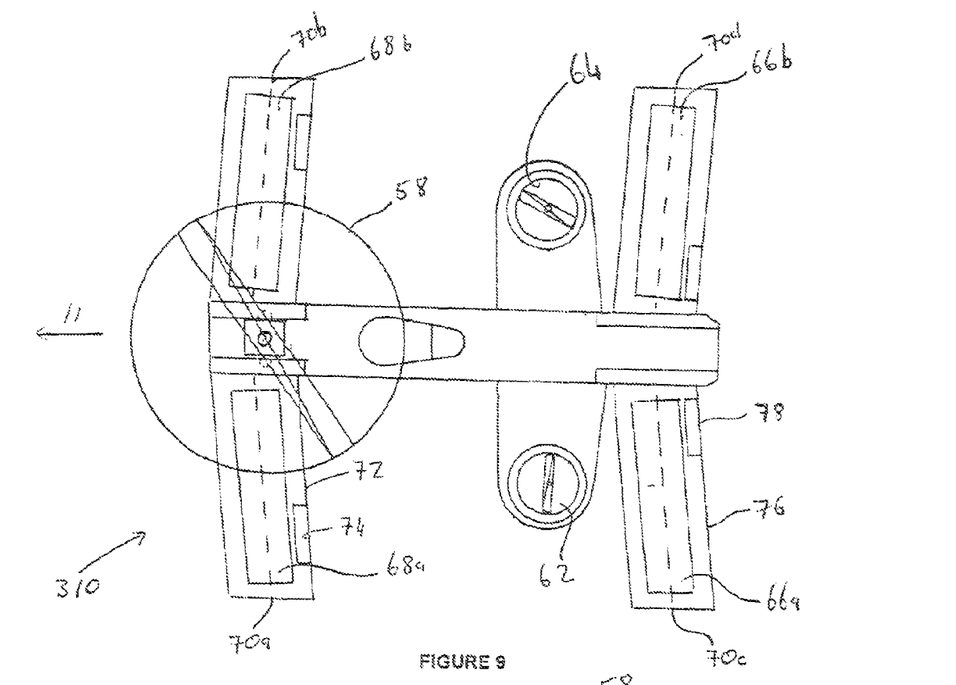
Figure 10:
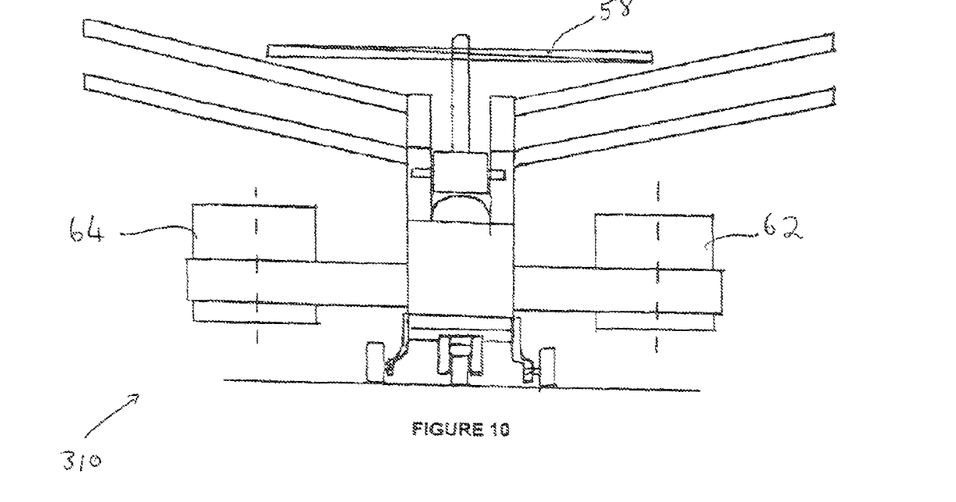

Turning now to FIGS. 8, 9 and 10, reference numeral 310 generally indicates an aircraft having an engine-driven rotor or propeller 58 which is able to be articulated or pivoted in a wide sector, e.g., in the direction of arrow 60 between a vertical and horizontal direction to permit aircraft lift and landing, and changes in movement, such as flight direction from substantially vertical to horizontal flight, and for hovering. Ducted fans 62 and 64 are provided to aid in creating stable vertical flight and hover. Further stability is created through the rapid rotation of two sets of rotary wings or aero foils 66 a and 66 b and 68 a and 68 b around axes 70 a, b, c and d as described with reference to FIGS. 6 and 7. While the left front wing static trailing edge 72 shows the left/port aileron 74, the rear wing trailing edge 76 shows the left/port elevator 78.

Figure 11:
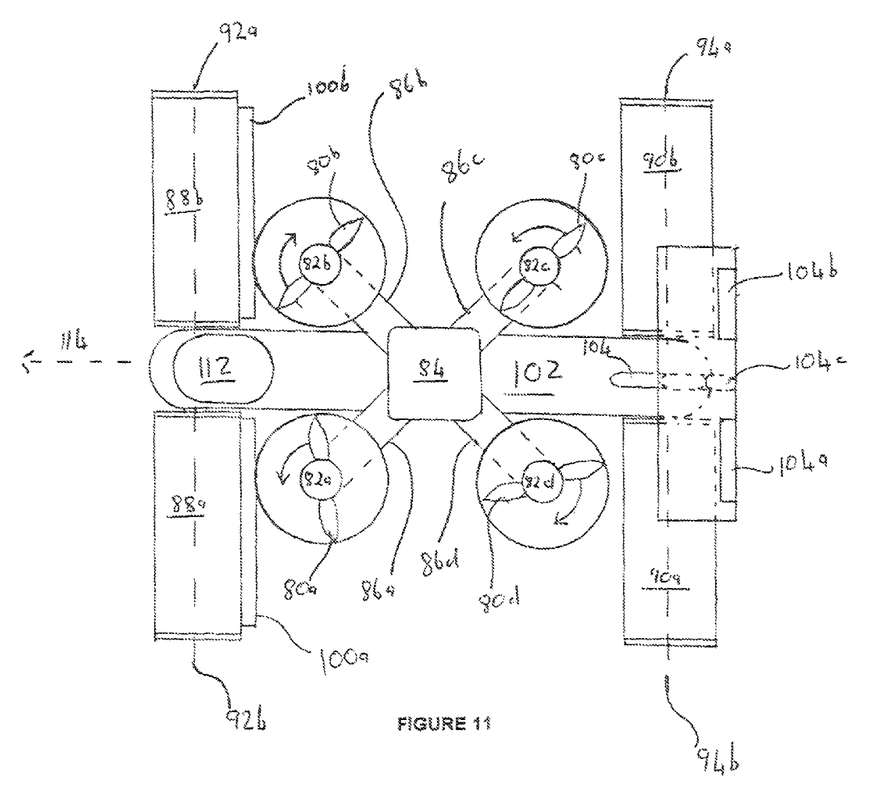
FIG. 11 is a plan view of a second embodiment of an aircraft including a transition arrangement, in accordance with the invention.

In FIG. 11 the reference numeral 410 depicts a plan view of a further embodiment of the principles; a multicopter—lifted and propelled by four or more rotors/propellers. This is an aircraft using the basic principles of inherently stable vertical and horizontal propulsion forces of the so-called quadrotor helicopter or quadrotor or quadcopter, with each pair of diagonally opposed rotors in a square setting rotating in one direction, opposite to the direction of rotation of the other set of rotors. Control and stability of vehicle motion is achieved by having the rotors computer-controlled with appropriate rapid response software, adjusted as a group through the balancing of lifting and torque forces for altering the pitch and/or rotation rate of one or more rotors, causing change to torque load and thrust/lift forces; typically aided by gyro stabilisation.

The aircraft 410 has four engine-driven rotors/propellers 80a, 80b, 80c and 80d, powered by four motors 82a, 82b, 82c and 82d arranged in a square formation, and linked to a control system 84 via linking arms 86a, 86b, 86c and 86d. Stability in flight is created by gyro stabilisation and having one set of diagonally opposed rotors/propellers 80 b and 80 d, having the same direction of rotation, but opposite to the direction of rotation of the remaining set of rotors/propellers, 80 a and 80 c.

A forward component to propulsion of the aircraft can be achieved by either tilting forward all of the four rotors/propellers, or by tilting forward at least two rotors, typically rotors 80 a and 80 b (direction of tilting not shown). The forward component to propulsion can also be achieved by tilting the aircraft platform (not shown) in a forward direction, by the differential increase or decrease of lift forces of the various rotors.

Figure 1:
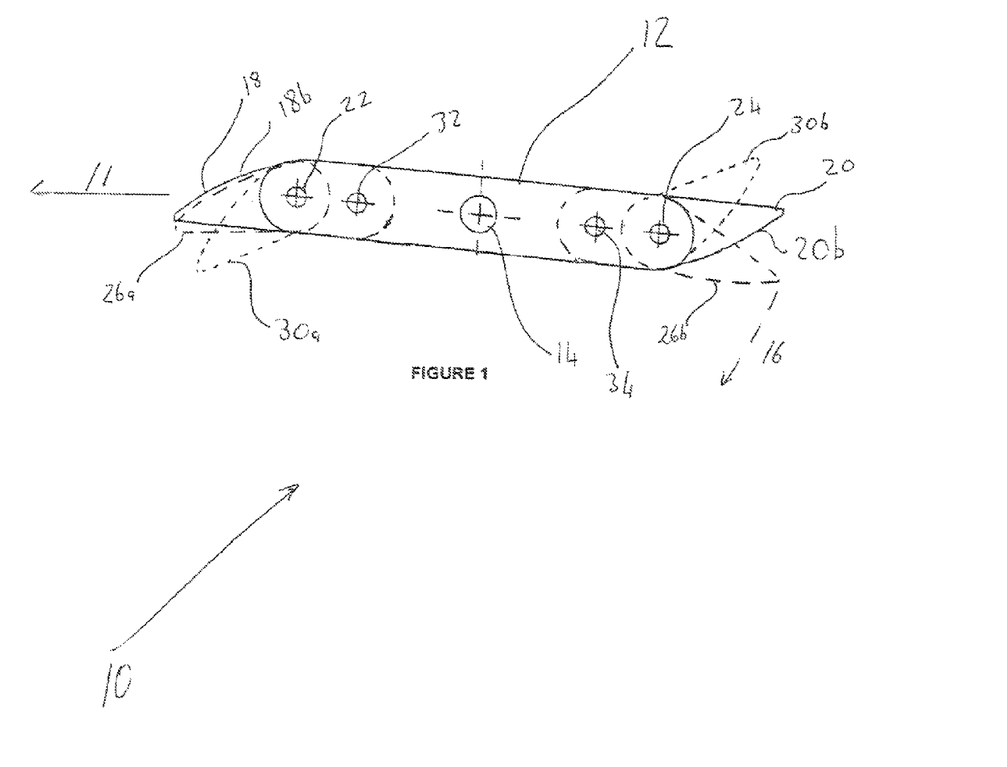
FIG. 1 is a cross sectional schematic representation of a first embodiment of a transition arrangement for an aircraft, in accordance with the invention.
Figure 2:
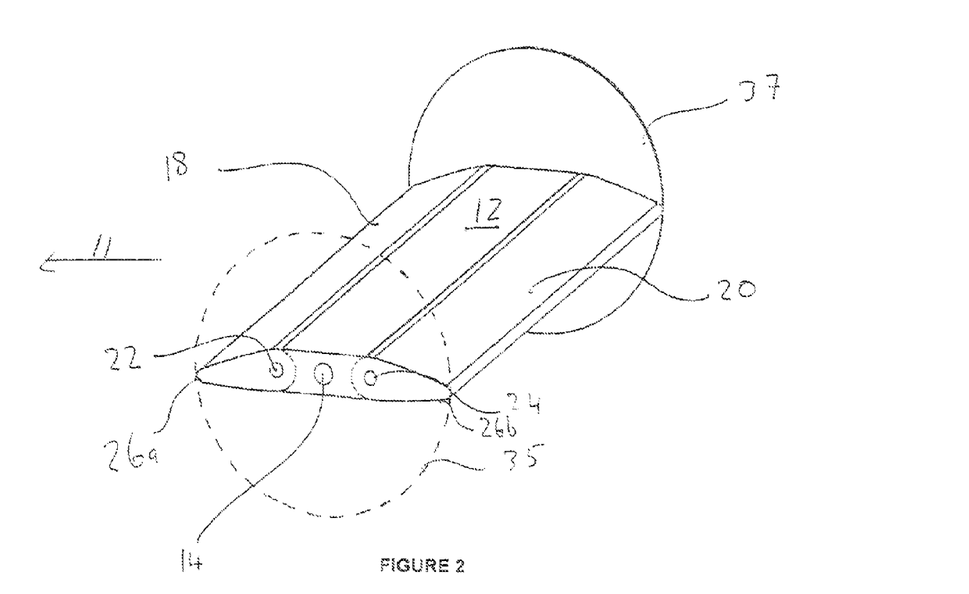
FIGS. 2 and 3 are further schematic representations of the transition arrangement as depicted in FIG. 1.
Figure 3:
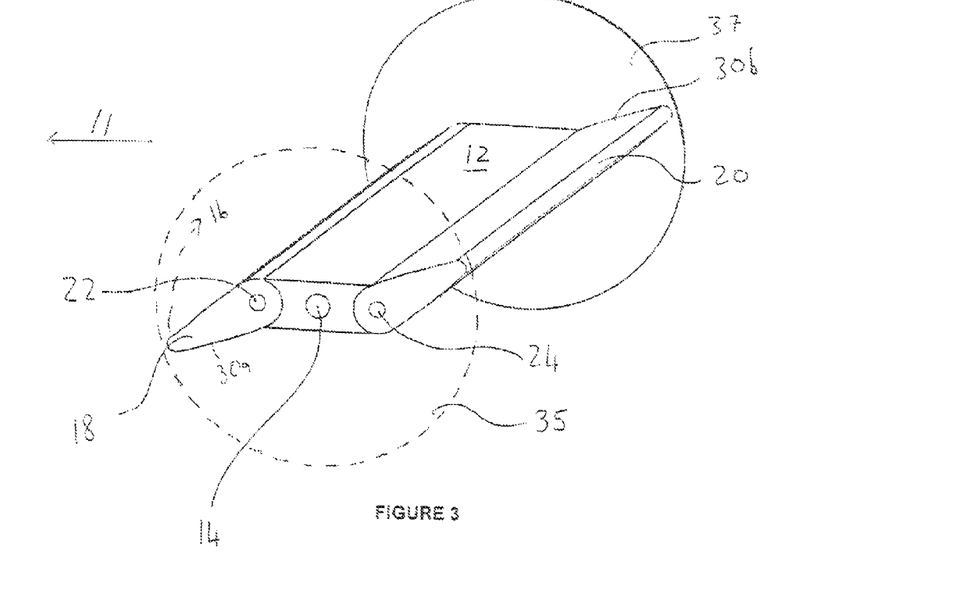
Figure 4:
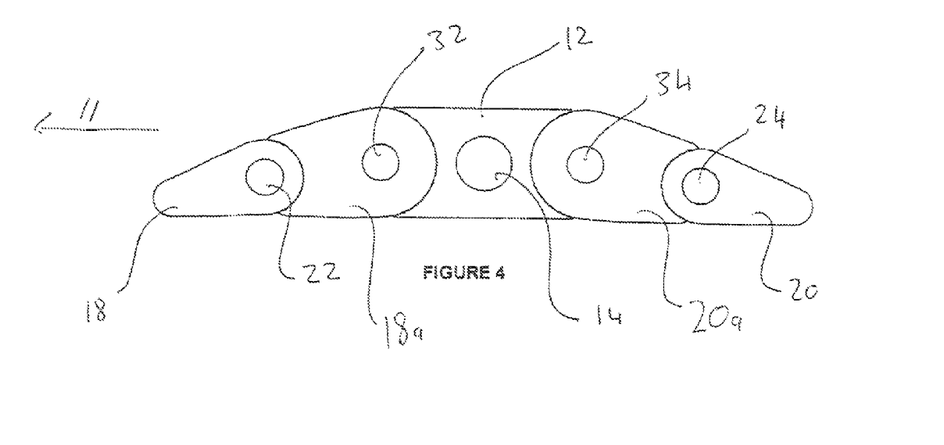
FIGS. 4 and 5 are cross sectional schematic representations of the transition arrangement as depicted in FIGS. 1 to 3 indicating further articulation points for smoother wing curvature.
Figure 5:
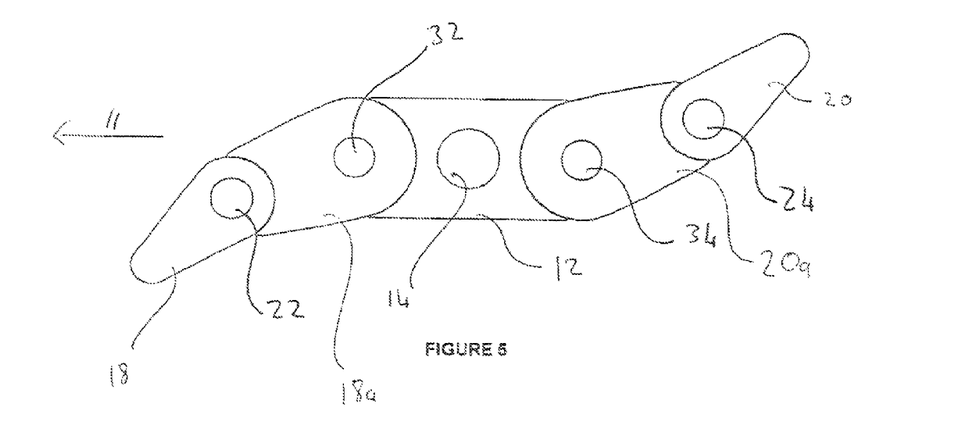

Further stability is provided by the rapid rotation of front and rear sets of rotary wings/aerofoils 88a and b and 90 a and b, around axes 92 a and b, and 94 a and b as described with reference to FIGS. 1 to 3. Left/port and right/starboard ailerons 100a and 100b are accommodated by static trailing edges 100a and 100b extending from the fuselage 102. Additional in-flight stability and control is provided by a tail wing 104, which accommodates the left/port elevator 104a, right/starboard elevator 104b, as well as the rudder 104c, arranged to the rear of the fuselage 102. A cockpit 112 for the pilot/auto pilot is arranged to the front of the fuselage, facing the direction of flight, 114. The abovementioned stability features are not essential to the quadcopter concept but must be seen as features assisting the stability of the craft.

During horizontal flight the rotary wings are typically in a stationary position shaped to create lift as conventional fixed-wing aircraft wings do. The static wing orientation may be continuously adjusted as the aircraft orientation or angle of attack changes.

In the multicopter embodiment of the invention the rotary wings are added, not so much for stable vertical flight in general, but as an aid to stable low-level horizontal flight including emergency landings, in wing-rotating-engine-driven, or auto-rotation-mode, with the additional benefit to be stationary during long distance flight, to create lift as conventional fixed-wing aircraft wings do, thereby enhancing the cost-effectiveness of the aircraft through reduced fuel use.

When considering the aircraft design as depicted in FIGS. 8 to 11, it should be kept in mind that many lay-outs are possible. Instead of two pairs of large wings, there can be one pair or more than 2 pairs. Instead of one large propeller (or small rotor), two can be utilised and the two ducted fans discarded. Other combinations of propelling sources and rotary wings are possible.

The positions of the rotary wings and their axes of rotation in FIGS. 8 to 11 relative to the main aircraft structure and flight paths will indicate how drag is to be created over a large area around each wing; almost 360° relative to each rotation axis so as to create a large area around the aircraft through which this drag will dampen or significantly slow down rapid fall, yaw, pitch and roll perturbations in orientation, especially during slow aircraft movement, such as vertical, near vertical and short/very short take-off and landing, and hover. These rotating wings can be, while in flight, continuously adjustable—e.g., speed of rotation and/or profile/shape of the foil—in relative drag effectiveness and/or lifting power, to aid in "balancing" the retarding drag/lift and thus the stability of the aircraft in flight, especially vertical flight and hover. This stability created by the continuous balancing of drag/lift forces by the rotating aerofoils can be combined with the balancing of the engine-powered direct lift forces created by rotors, fans, etc, for greater stability. To aid stable hover, as well as for stable perpendicular vertical lift and landing purposes, the front and rear sets of wings/aerofoils are adjusted to rotate in opposite directions (counter-rotate) relative to each other. For stable transition from vertical to horizontal flight, the front set of wings/aerofoils is firstly adjusted to static level flight mode, to aid in lift of the aircraft, followed by adjusting the rear set of wings/aerofoils to stop rotating to also become static during the forward pulling propulsion of the aircraft, thereby stabilising the aircraft against the sudden destabilizing movements of the forward pulling propulsion system. For stable transition from flight to landing, the rear set of wings/aerofoils is firstly adjusted to rotate creating drag to slow down the aircraft, followed by the adjustment of the front set of wings/aerofoils and the flying propulsion system for landing. To aid in further flight stability, gyroscopic elements can be added, and gyroscopic effects are created by dedicated mechanisms (e.g., electronic) for this purpose as well as the spinning wings. During normal level flight the rotary wings are typically retracted and stationary, and shaped appropriately, within the main wing structure to help act as lifting devices as conventional wings do in normal level and maneuvering flight. To enhance the Magnus effect tip-/side-/end-plates can be used to cover a significant part of the wing ends by partly cutting off non-radial air-flow off the wing ends; and, by attaching these end-plates fixedly to the rotating wing ends, they can be used as platforms for the mechanisms which brake wing rotation and lock them in place in their non-rotational mode, as well as for the said changing of the wing shape/profile, while rotating or stationary, typically through utilising a servo and/or rack-and-pinion system with elements mounted on the side-plates, such a system in communication with a control device on the aircraft, or in communication with a remote control device.

The stabilisation of the aircraft (pilot or autopilot) can further be assisted by a flight control system which monitors and rapidly warns or acts to counter a crisis situation. Monitoring can be achieved through instruments such as an accelerometer, gyro, inclinometer, GPS, compass, altitude meter, rotor and wing rotational speed meter, etc. Parameters such as engine power, flight and motor controls, position, air speed, acceleration, altitude, wind and general weather data, aircraft inclination, heading, pitch, roll, and yaw can be monitored.

Secondary/auxiliary/emergency sources of power and control can be available, for instance an emergency generator, compressor, hydraulics, propulsion, control surface and rotor and rotary wing actuators, to be activated automatically and/or by pilot intervention.

The aircraft pilot and/or autopilot can have the capability to change the aircraft into, inter alia, any of the following general flying conditions:

stable vertical or near vertical—and sometimes also horizontal—flying with engine-powered wing rotation, in conjunction with an engine-powered propulsion force;

stable air-braking when approaching the ground, hovering and landing, typically in short distance landing e.g., during an emergency, with no or insufficient engine power, with wings auto-rotating, i.e., rotation achieved by a combination of wing shape adapted and air-flow over them, to supply parachute-like drag and a measure of aerodynamic lift; and     during normal horizontal or level flight utilizing engine power, having the wings in their static conventional role, and their shape/profile adjusted, acting to create lift and flight maneuvering capabilities, and a conventional stable flight.

The rotation of the aerofoil will be typically about its midchord spanwise axis, and the wing (near-) horizontal and at a (almost) right angle to the flight direction during normal level flying.

In addition to what has been described, the inventor believes that the rotary wings will be applicable in stabilizing and controlling a rotary wing aircraft in the following hypothetical scenarios:

1. Pilot/auto-pilot design and procedures for low-level flying or emergency:

In an emergency, caused by a power and/or mechanical failure, or when flying or hovering near the ground, when rapid reaction is required to create a safe landing, any one/combination of the following measures can be applied by the pilot and/or auto-pilot, with/without electro-mechanical assistance:

1.1 If the wings are in rotary mode, they should be released/freed to initiate airflow induced auto-rotation;

1.2 If the wings are in stationary mode, there should be a "quick-release" mechanism to induce airflow auto-rotation;

1.3 The pilot/auto-pilot should have a manual aid (preferably electro-mechanically enhanced) for rapidly preparing wing shape, free the wing to auto-rotate and to give it a rotating "kick-start" (needed when airflow alone will not automatically initiate auto-rotation) to initiate airflow induced auto-rotation with the aid of or independent from an auxiliary power source; and         1.4 An emergency source of power should be available for adjusting, inter alia, wing profiles and relative speeds of wing rotation.

2. Early warning:

2.1 The following information should be used to signal the need for wing rotation in emergency or when approaching the ground:

2.1.1 relevant information on weather/wind;

2.1.2 aircraft inclination, the distance from ground and speed of approach;

2.1.3 vibration or bending caused or experienced by rotating parts and danger to structural integrity (especially when a rapid landing is needed).

2.2 A signal could be used to determine the appropriate

2.2.1 time and or point on when the wing(s) is/are to be released to rotate; auto-rotate or be powered to rotate; and     2.2.2 speed of wing rotation needed and achieved.

3. Systems redundancy:

The following counter-measures/mechanisms to system failures should be available:

3.1 In case of the main power source failing, an independent secondary power source in the form of electricity and/or a container of pressurised gas should be available;

3.2 where muscle power is required to, eg, initiate airflow induced auto-rotation of the wings, once a first set of wings has reached a minimum speed of rotation, it should automatically couple to a second set of wings to induce their rotation, and so forth; and 3.3 rotating wings could generate electrical power to be used by other systems.

Accordingly, it is an object of this invention to create a relatively inexpensive and safe aircraft or airborne platform with propulsion system (e.g., propeller, rotor, jet engine) for both vertical or short take-off and landing as well as horizontal flight, similar to other designs, and the novel advantage of a wing or airfoil which through its movement—e.g., rotary action—creates drag and lift through the Magnus effect during movement, and thus a more stable and safe ascent/descent or hover, and for normal level flight the same wing is changed into a conventional static aircraft wing for creating lift and to aid in maneuvering the platform, as well as giving better fuel efficiency than the popular helicopter.

It is to be appreciated that a transition arrangement as hereinbefore described is not limited to the precise functional and constructional details as set out above and which may be varied as desired.

The invention claimed is:

1. A transition arrangement for an aircraft for aiding stabilization of the aircraft between substantially vertical and horizontal flight of the aircraft, the transition arrangement including:
   an aerofoil;
   a primary shaft extending away from the aircraft for mounting the aerofoil rotatably adjacent a static edge of an aircraft wing;
   the aerofoil further including;
      a pair of secondary shafts arranged on either side of the primary shaft, the pair of secondary shafts having a pair of secondary aerofoils mounted thereon;
   wherein the primary and secondary shafts are interconnected so as to allow the shafts to be rotatable relative one another.

2. The transition arrangement as claimed in claim 1 wherein the static edge takes the form of a trailing edge of the wing.

3. The transition arrangement as claimed in claim 1 wherein the static edge takes the form of a leading edge of the wing.

4. The transition arrangement as claimed in claim 1 wherein the transition arrangement is mounted on a tail wing of the aircraft.

5. The transition arrangement as claimed in claim 1 which includes a rotary drive means for rotating the aerofoil via the primary shaft.

6. The transition arrangement as claimed in claim 1 wherein the primary shaft extends longitudinally to the wing from a distal wing tip region of the wing towards a proximal region, the wing extending from a fuselage of the aircraft.

7. The transition arrangement as claimed in claim 1 wherein the primary and secondary shafts are interconnected via linkages.

8. An aircraft including a transition arrangement as claimed in claim 1, said aircraft including:
   a fuselage with wings attached thereto;
   ailerons and elevators arranged onto the wings; and
   propulsion means arranged onto the aircraft to facilitate vertical and/or horizontal flight.

9. The aircraft as claimed in claim 8 wherein the propulsion means is selected from the groups consisting of a propeller, rotor, fan, and jet engine.

10. The aircraft as claimed in claim 8 wherein the wings are adapted for rotation, and wherein the speed of rotation and/or aerofoil profile of one rotating wings can be continually adjusted relative to another of the rotating wings to create greater flight stability.

11. The aircraft as claimed in claim 8 wherein vertical flight is enhanced by a vertical lift system comprising an articulated rotor or set of rotors, wherein stability is created by a continuous balancing of drag-lift forces created by the rotating aerofoil, combined with the balancing of the engine-powered vertical lift system.

12. The transition arrangement as claimed in claim 1 wherein a further aerofoil is mounted on the primary shaft.

13. The transition arrangement as claimed in claim 12 wherein the further aerofoil is of z-form.

14. The transition arrangement as claimed in claim 13 wherein the further aerofoil, together with the secondary aerofoils close off an opening defined between the leading and trailing edges of the wing to facilitate toward flight of the aircraft, when in operative condition.

15. The transition arrangement as claimed in claim 13 wherein the further aerofoil together with the secondary aerofoils defines a substantial Z or S profile for wing rotation, engine powered or airflow driven autorotation, for vertical flight or emergencies, when in operative condition.

* * * * *